Jan. 5, 1943.   W. W. PARKER ET AL   2,307,536
REGULATOR SYSTEM
Filed June 17, 1941
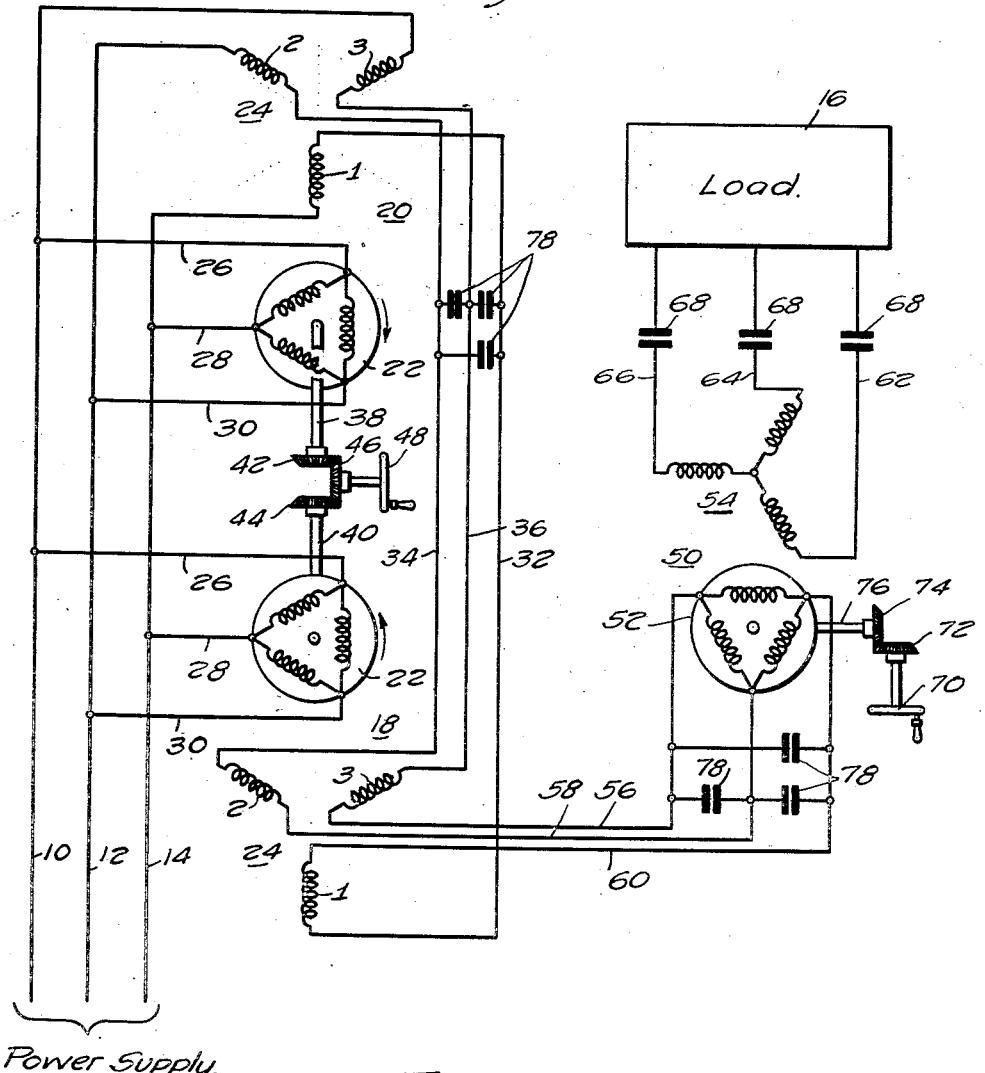
Fig.1.
Power Supply.
Fig. 2.
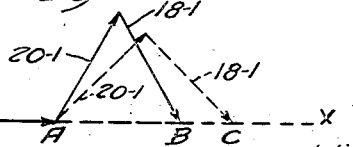
WITNESSES:
E. A. McCloskey
Wm. C. Groome
INVENTORS
William W. Parker and
Robert D. Evans.
BY
James K. Ely
ATTORNEY Patented Jan. 5, 1943

2,307,536

UNITED STATES PATENT OFFICE 2,307,536

REGULATOR SYSTEM

William W. Parker, Irwin, and Robert D. Evans, Swissvale, Pa., assignors to Westinghouse Electric & Manufacturing Company, East Pittsburgh, Pa., a corporation of Pennsylvania Application June 17, 1941, Serial No. 398,378

5 Claims. (Cl. 171—119)

This invention relates to regulator systems.

An object of this invention is to provide in a regulating system for the regulation of voltage and phase angle independently of each other.

Another object of this invention is to provide in a regulating system for the independent regulation of voltage and phase angle and for compensating for the leakage reactance of the voltage and phase-angle regulating apparatus.

Other objects of this invention will become apparent from the following description when taken in conjunction with the accompanying drawing, in which:

Figure 1 is a diagrammatic illustration of a regulating system embodying the teachings of this invention; and Fig. 2 is a single-phase simplified vector diagram illustrating the operation of the regulating system of Fig. 1.

Referring to Fig. 1, there is illustrated a regulating system embodying the present invention. In this figure, three phase supply conductors 10, 12 and 14 are illustrated as being connected to any suitable source of power supply and connected through the regulating apparatus to load 16.

As illustrated, two induction regulators 18 and 20 are electrically connected to the conductors 10, 12 and 14. Each of the regulators 18 and 20 comprise rotor windings 22 and stator windings 24, the windings of each of the regulators being electrically identical. The rotor windings 22 of each regulator are electrically connected in the same relation to the supply conductors 10, 12 and 14 by conductors 26, 28 and 30, respectively.

The stator windings 24 of each of the regulators 18 and 20 are also electrically identical, and are electrically connected in circuit with the supply conductors 10, 12 and 14. As illustrated, the phase windings 1, 2 and 3 of the stator windings 24 of regulator 18 are connected by conductors 32, 34 and 36 in series circuit relation with the phase windings 1, 2 and 3, respectively, of the stator windings 24 of regulator 20. The phase windings 3, 2 and 1 of the stator of regulator 20 are in turn connected to the supply conductors 10, 12 and 14.

The rotor windings of each of the regulators 18 and 20 are mechanically coupled, as by means of the shafts 38 and 40, and the differential connection formed of the end or sun gears 42 and 44 and the middle or planetary gear wheel 46. By connecting the rotors in this manner, they may be actuated for movement in opposite directions, the purpose of which will be explained more fully hereinafter by manual operation of the handle 48 which is mechanically coupled to the planetary gear 46.

The stator windings of the regulator 18 are electrically connected to a phase shifter 50. In this instance, the phase shifter 50 is illustrated as being a three-phase shifter having the delta-connected three phase rotor windings 52 and the star-connected three phase stator windings 54.

As illustrated, the stator windings of the regulator 18 are connected by conductors 56, 58 and 60 to the rotor windings of the phase shifter 50. The stator winding 54 of the phase shifter 50 are electrically connected by conductor 62, 64 and 66 through series capacitors 68 to the load. The series capacitors 68 are provided for compensating for the leakage reactance of the regulators and phase shifter. The phase shifter 50 is disposed to be operated in any suitable manner, such as by manually operating or moving the handle 70, which is connected through the gears 72 and 74 to actuate the shaft 76 upon which the rotor windings 52 are mounted.

A capacitor 78 is also provided connected in shunt across each of the phase windings of each of the regulators 18 and 20. These shunt connected capacitors correct the excitation of the regulators to unity power factor.

In operation, assuming that the regulators 18 and 20 and the phase shifter 50 are connected as described hereinbefore if, for any reason, it is desired to change the voltage to effect an increase or a decrease at the load, the voltage may be changed by manually operating the differential to effect a movement of the rotor windings 22 of each of the regulators 18 and 20. As the handle 48 is turned, an equal but opposite displacement or movement of the rotor windings 22 with respect to their associated stator windings 24 of each of the regulators is effected. The movement of the rotor windings of the regulators 18 and 20 effects a change in the induced voltage which is added directly to the supply voltage to give a scalar adjustment of the voltage across the stator windings 24 of the regulator 18. Since the stator windings 24 of the regulators 18 and 20 are connected in series, and since the rotor windings are actuated an equal amount but in opposite direction, any phase-angle change in the respective regulators is neutralized, giving a resultant change in the output voltage across the stator windings 24 of the regulator 18 which is always in phase with the supply voltage.

The effect of the operation of the regulators on the voltage across the phase shifter is clearly illustrated in Fig. 2, in which the simplified single-phase vector diagram is illustrative of changes in the voltage effected by operation of the regulators. As illustrated, the voltage NA is a single-phase line-to-neutral voltage of the power supply. The voltages indicated by the solid lines 20—1 and 18—1 are the voltages induced in the stators of the regulators 20 and 18, respectively, for a given position of the rotor windings 22. The voltage NB is representative of the output voltage of the combined regulators 18 and 20 connected as described. The voltages indicated by the dotted lines 20—1 and 18—1 are the voltages induced in the stator windings of the regulators 20 and 18, respectively, for another position or setting of the rotor windings of the regulators, the voltage NC representing the output voltage of the regulators for this particular setting of the rotor windings. As clearly illustrated in the vector diagram, the output voltage of the combined regulators 18 and 20 connected as described is adjustable from zero to twice the value of NA, but is always along the phase position as indicated by the line NX. Thus, as illustrated in the operation of the regulators 18 and 20, the phase-angle change inherent in each of the regulators is neutralized.

Although in the embodiment illustrated capacitors 78 are illustrated as being connected in shunt across the phase windings of each of the stators 24 of the regulators 18 and 20, respectively, it may be found that such capacitors are not necessary. However, in a commercial application of the present invention, it was found necessary to include the capacitors 78 as described for correcting the excitation of the regulators to unity power factor.

The voltage output from the regulators can be delivered to the load without changing the phase angle provided the phase shifter 50 is so positioned that its rotor windings 52 and stator windings 54 are in phase. If, however, after adjusting the voltage by means of actuating the rotor windings of the regulators 18 and 20, it is desired to make a definite adjustment in the phase angle, the position of the rotor windings 52 of the phase shifter 50 is adjusted by turning the operating handle 70, to effect a phase displacement between the rotor windings 52 and the stator windings 54. Whether the regulators 18 and 20 are operated independently of the phase shifter 50, or in conjunction therewith, it is found that the capacitors 68 connected in series with the stator windings 54 of the phase shifter 50 effectively compensate for any leakage reactance of both the regulators and the phase shifter. That the capacitors compensate for the reactance of the regulators and phase shifter is quite evident in that the reactance of the three-phase regulators 18 and 20 is constant at all times.

Although this invention is illustrated by reference to two induction regulators connected to be manually operated in equal but opposite directions, it is, of course, understood that other means of operating the induction regulators to effectively neutralize the phase-angle change in each of the regulators may be used. For example, induction regulators having electrically identical rotor windings, with the exception that the one winding is wound in an opposite direction from that of the other, may be used where such rotor windings are mounted on and disposed to be adjusted by movement of the same shaft. Where the rotor windings are wound in this manner and mounted on the same shaft, they are, of course, adjusted in the same direction, but the effects are equal and opposite, so that the phase-angle changes of each of the regulators neutralize each other.

By means of this invention, it is possible to obtain independent regulation of voltage and phase angle. This invention has been found to be extremely useful in industry for various applications. A particular application is in the supplying of power to the apparatus known as "A. C. network calculators." In such apparatus, it is necessary to represent actual system generators or power stations, and it is necessary to apply to the calculator voltages which are adjustable in magnitude and phase angle. With the system of this invention employed in such calculators, the voltage adjustment corresponds to changes in excitation, and the phase-angle adjustment corresponds to changes in the governor position. Thus, with the regulating system of this invention, it is possible to adjust the voltage and the phase angle of the voltage applied to the calculator through a minimum of operations, while at the same time effecting independent regulation of both the voltage and the phase angle.

We claim as our invention:

1. In a regulator system, in combination, an alternating-current power supply circuit, means electrically connected in the circuit for independently regulating the voltage and the phase angle of the circuit, said means comprising a pair of three-phase induction regulators having rotor windings and stator windings and an independent three-phase phase shifter, the rotor winding of each of the induction regulators being electrically connected to the supply circuit and disposed for simultaneous operation, the stator windings being so electrically connected to the supply circuit and to each other that the phase-angle change in each of the regulators effected by the operation of the regulators is neutralized, the phase shifter being electrically connected to the stator windings of the induction regulators disposed for operation independently of the regulators, and means electrically connected in circuit with the phase shifter for compensating for the leakage reactance of the regulators and the phase shifter.

2. In a regulator system, in combination, an alternating-current power supply circuit, means electrically connected in the circuit for independently regulating the voltage and the phase angle of the circuit, said means comprising a pair of three-phase induction regulators having rotor windings and stator windings and an independent three-phase phase shifter, the rotor winding of each of the induction regulators being electrically connected to the supply circuit in the same electrical relation, the rotor windings being disposed for simultaneous movement to effect a regulating operation, the stator windings being so electrically connected in series circuit relation with each other and to the supply circuit that the phase-angle change inherently in each of the induction regulators when they are operated is neutralized, the phase shifter being electrically connected to the stator windings of the induction regulators disposed for operation independently of the regulators, and means electrically connected in circuit with the phase shifter for compensating for the leakage reactance of the regulators and the phase shifter.

3. In a regulator system, in combination, an alternating-current power supply circuit, means electrically connected in the circuit for independently regulating the voltage and the phase angle of the circuit, said means comprising a pair of three-phase induction regulators having rotor windings and stator windings and an independent three-phase phase shifter, the rotor winding of each of the induction regulators being electrically connected to the supply circuit in the same electrical relation, the rotor windings being disposed for simultaneous movement to effect a regulating operation, the stator windings being so electrically connected in series circuit relation with each other and to the supply circuit that the phase-angle change inherently in each of the induction regulators when they are operated is neutralized, the phase shifter being electrically connected to the stator windings of the induction regulators disposed for operation independently of the regulators, and a capacitor electrically connected in circuit with the phase shifter for compensating for the leakage reactance of the regulators and the phase shifter.

4. In a regulator system, in combination, an alternating-current power supply circuit, means electrically connected in the circuit for independently regulating the voltage and the phase angle of the circuit, said means comprising a pair of three-phase induction regulators having rotor windings and stator windings and an independent three-phase phase shifter, the rotor winding of each of the induction regulators being electrically connected to the supply circuit and disposed for simultaneous operation, the stator windings being so electrically connected to the supply circuit and to each other that the phase-angle change in each of the regulators effected by the operation of the regulators is neutralized, the phase shifter being electrically connected to the stator windings of the induction regulators disposed for operation independently of the regulators, a capacitor associated with each of the stator windings and electrically connected in shunt circuit relation therewith, and a capacitor electrically connected in series circuit relation with the phase shifter, the series connected capacitor compensating for the leakage reactance of the regulators and the phase shifter.

5. In a regulator system, in combination, an alternating-current power supply circuit, means electrically connected in the circuit for independently regulating the voltage and the phase angle of the circuit, said means comprising a pair of three-phase induction regulators having rotor windings and stator windings and an independent three-phase phase shifter, the windings of the regulators being electrically identical with the rotor windings of each being electrically connected to the supply circuit in the same electrical relation, the rotor windings being mechanically coupled and disposed for equal but opposite movements to effect a regulating operation, the stator windings being so electrically connected in series circuit relation with each other and to the supply circuit that the phase angle change inherently in each of the regulators when they are operated is neutralized, the phase shifter being electrically connected to the stator windings of the regulators and disposed for operation independently of the regulators, and means electrically connected in circuit with the phase shifter for compensating for the leakage reactance of the regulators and the phase shifter.

WILLIAM W. PARKER.
ROBERT D. EVANS.